(12) United States Patent
Nienhaus

(10) Patent No.: US 6,398,400 B1
(45) Date of Patent: Jun. 4, 2002

(54) BEARING BUSHING AND MACHINE PART FOR RECEIVING THE BEARING BUSHING

(75) Inventor: Christian Nienhaus, Bocholt (DE)

(73) Assignee: A. Friedr. Flender AG, Bocholt (DE)

( * ) Notice: Subject to any disclaimer, the term of this patent is extended or adjusted under 35 U.S.C. 154(b) by 49 days.

(21) Appl. No.: 09/706,256

(22) Filed: Nov. 3, 2000

(30) Foreign Application Priority Data

Nov. 3, 1999 (DE) .......................................... 199 52 869

(51) Int. Cl.[7] .............................................. F16C 23/10
(52) U.S. Cl. ...................................... 364/255; 384/447
(58) Field of Search ................................ 384/255, 447

(56) References Cited

U.S. PATENT DOCUMENTS

| | | | | |
|---|---|---|---|---|
| 276,292 A | * | 4/1883 | Seymour | 384/255 |
| 2,245,925 A | * | 6/1941 | Klaucke | 474/89 |
| 2,691,553 A | * | 10/1954 | Pettigrew | 384/447 |
| 3,888,134 A | * | 6/1975 | Miranda | 384/255 |
| 4,569,423 A | * | 2/1986 | Hirano | 384/255 |
| 4,889,436 A | * | 12/1989 | Lynn, Jr. | 384/255 |
| 5,024,122 A | * | 6/1991 | Parzl et al. | 74/417 |

* cited by examiner

Primary Examiner—Thomas R. Hannon
(74) Attorney, Agent, or Firm—Thomas S. Baker, Jr.

(57) ABSTRACT

A bearing bushing has an outer lateral surface (2), an inside bore (1) arranged eccentrically to the lateral surface (2), as well as a flange (3) extending beyond the lateral surface. In the flange (3), on a circle (5) arranged concentrically to the lateral surface (2), there are bores (6) for receiving the fastening screws (14) which engage bores (7) on an equally-large circle (5') in the machine part (4). The eccentricity of the inside bore (1) of the bearing bushing is asymmetrical in at least one plane in relation to the lateral surface (2) of the bearing bushing or in relation to the circle (5'), containing two perpendicular planes of symmetry, of bores (7) in machine part (4). The center ($M_1$) of the inside bore (1) lies outside of the two axes of symmetry (11) of the lateral surface (2) of the circle (5') of bores (7).

6 Claims, 4 Drawing Sheets

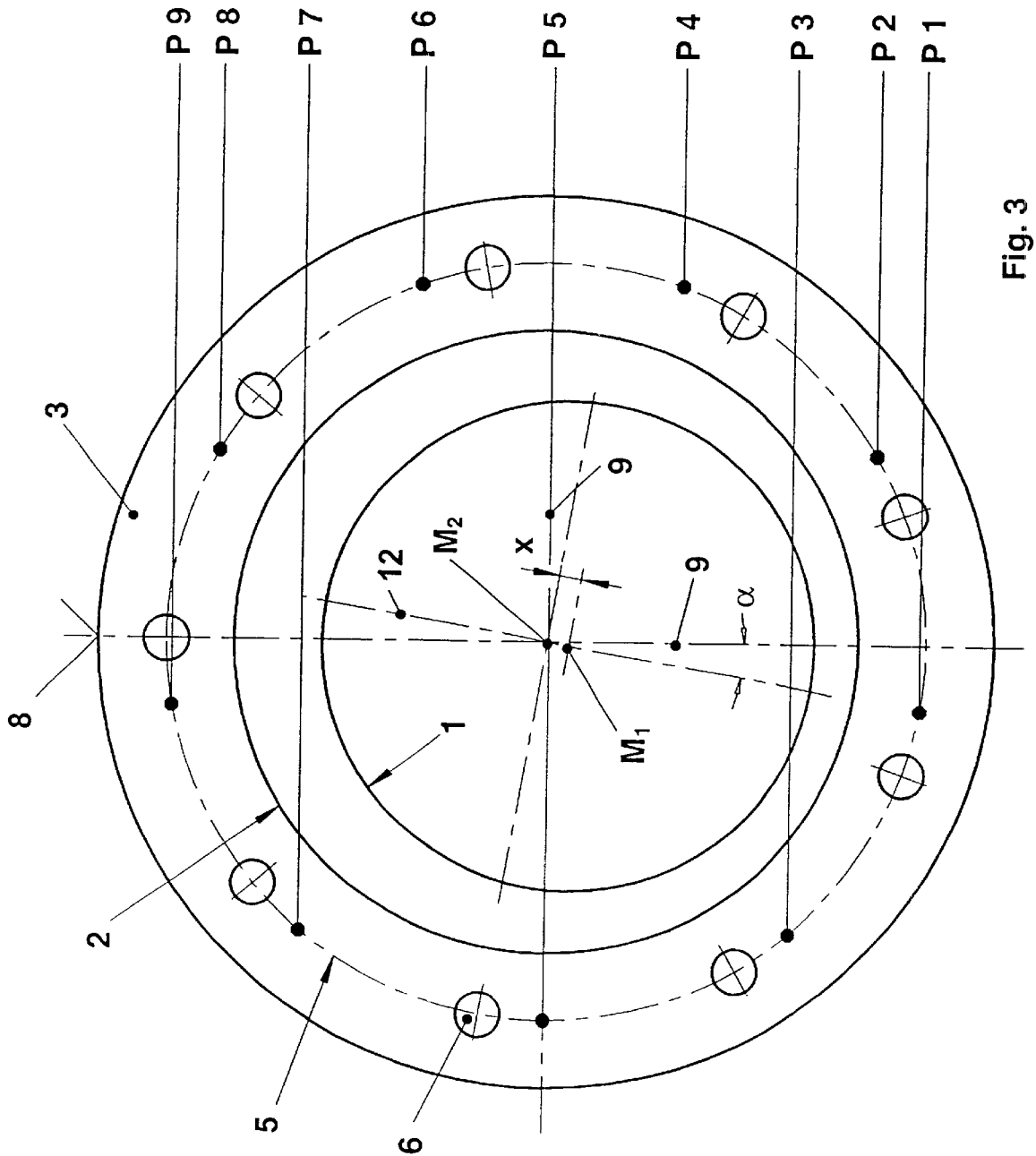

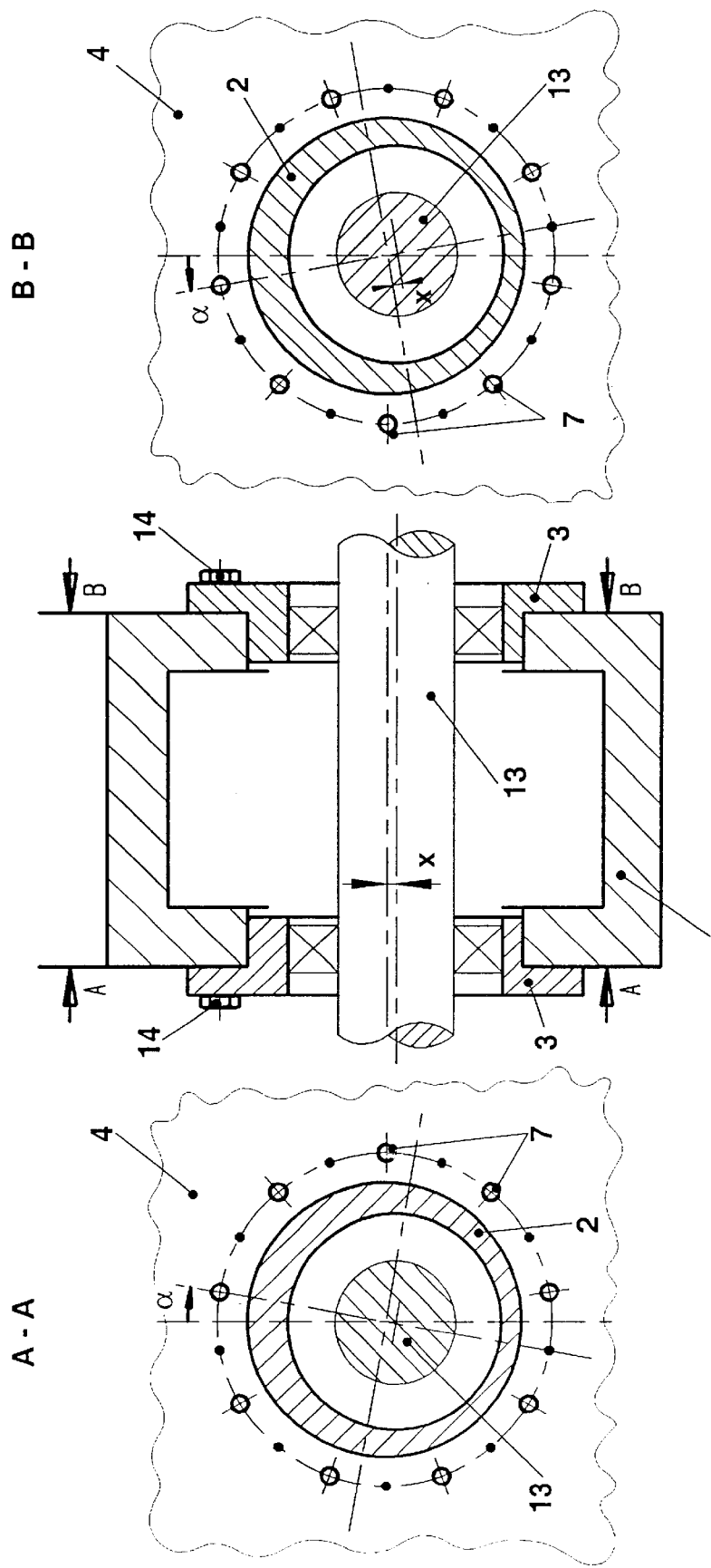

BEARING BUSHING AND MACHINE PART FOR RECEIVING THE BEARING BUSHING

The invention relates to a bearing bushing and a machine part for receiving the bearing bushing which are adjustable.

Such bearing bushings are used in mechanical engineering in order to be able to modify the mutual distance between two components, e.g. two shafts, within a certain range. The bores, uniformly arranged around the circumference of the flange for receiving the fastening screws, permit the bearing bushing to be fastened to a machine part in various adjustment positions by means of the fastening screws.

In known bearing bushings, the eccentricity of inside bore and lateral surface is symmetrical to the identically-arranged (arranged in the same way) drill patterns of the N bores in the flange and the machine part, i.e. the center of the inside bore lies on one of the two axes of symmetry, which are perpendicular to one another, of the lateral surface. With such a symmetrical design, the number of possible adjustment points of the bearing bushing versus the machine part is limited to, at the most, the next higher whole number of half N/2 of the existing bores N. A finer graduation of the adjustment of the eccentricity is only possible by increasing the number of bores for receiving the fastening screws, which increases the manufacturing costs.

The object of the invention is to modify the generic bearing bushing and the generic machine part for receiving the bearing bushing in such a way that, with the same number N of bores in the flange and the receiving machine part, a finer adjustment of the eccentricity can be achieved by enlarging the known N/2 positions to N positions and excluding the source of error of the parallelism deviation of the axis.

Figure 2:
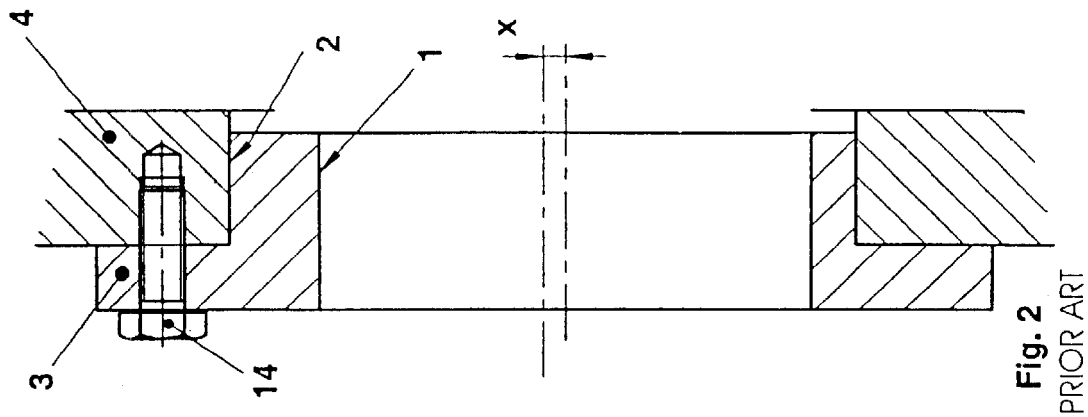
Figure 1:
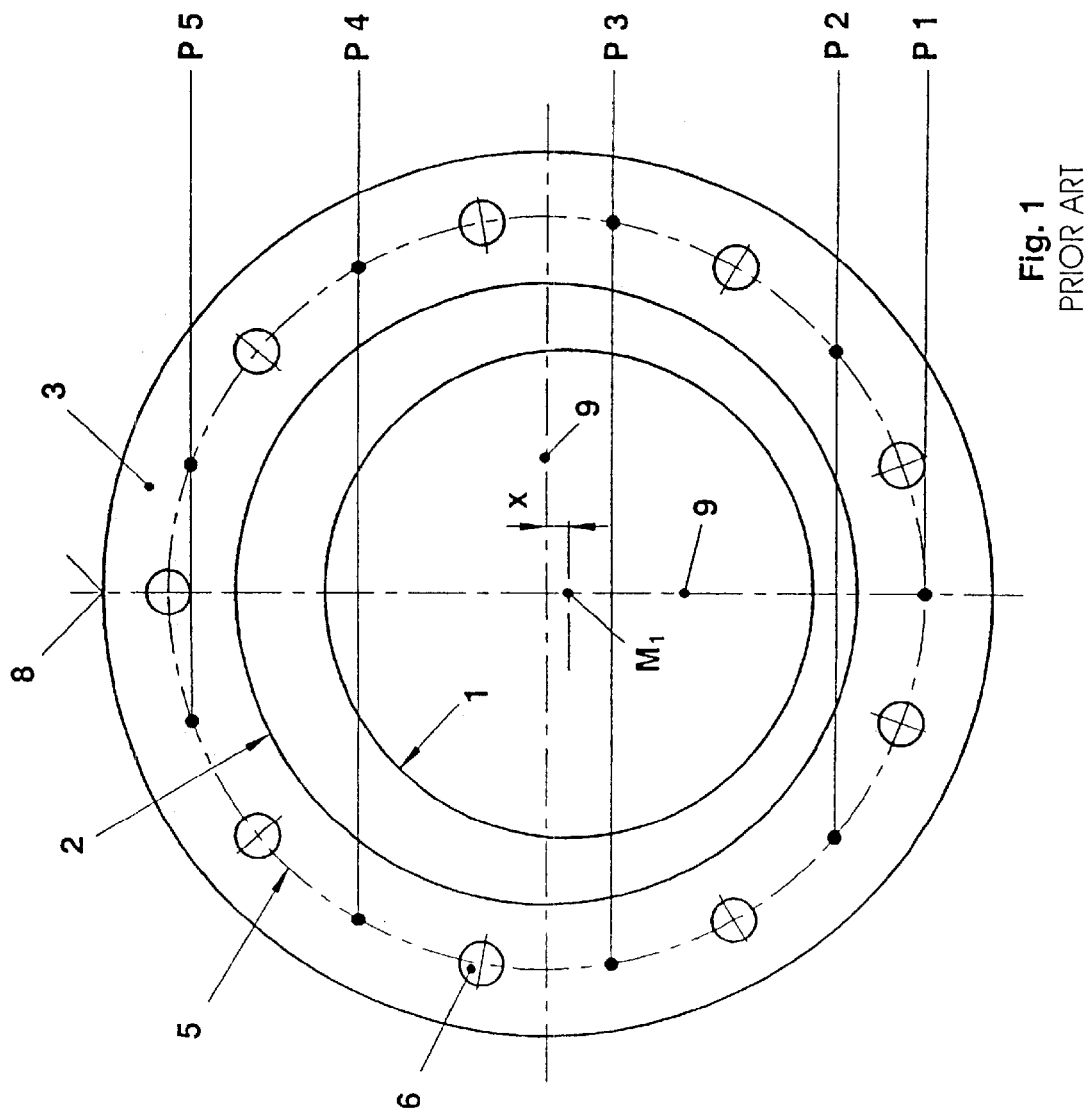
Figures 4, 4A, 4B:
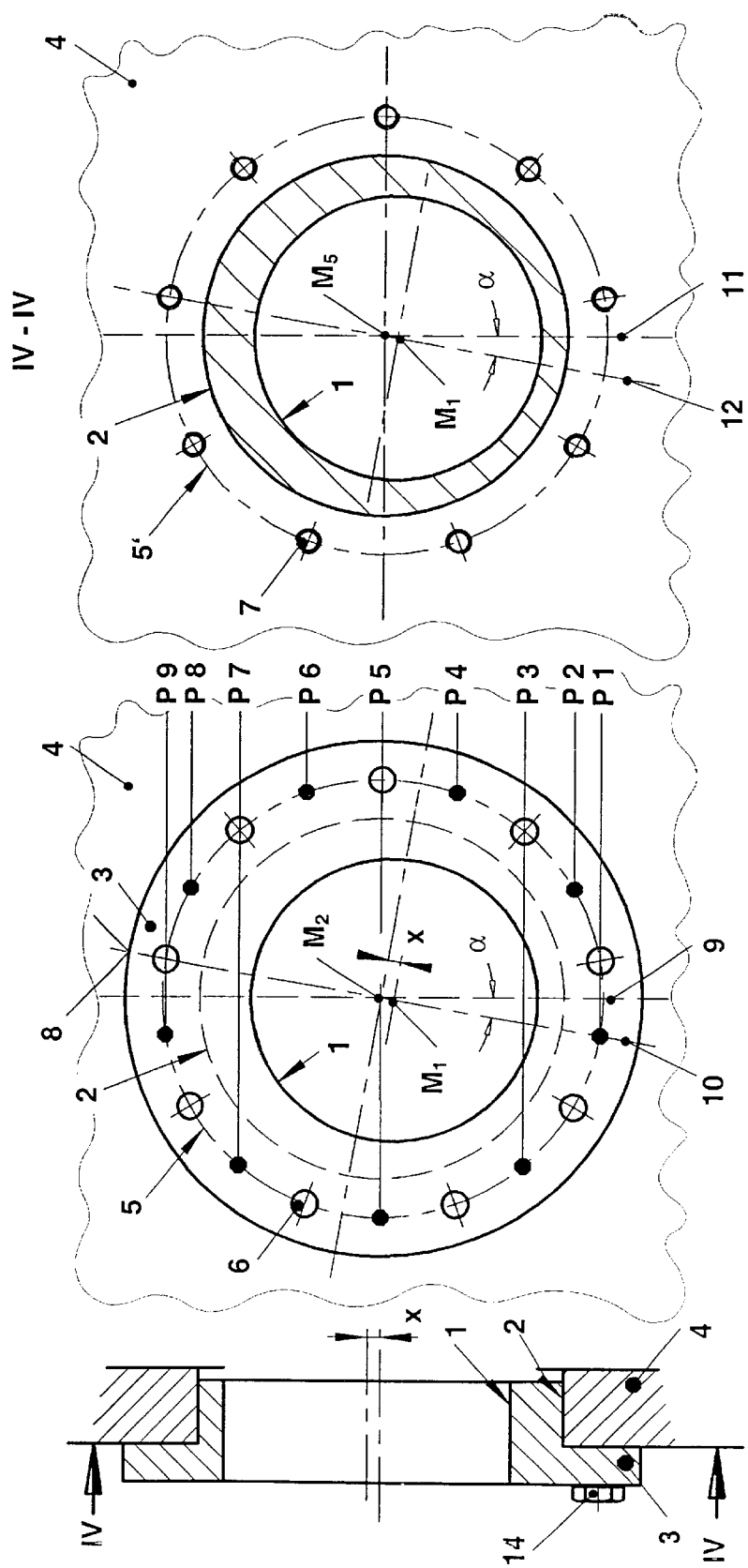

The invention and the advantages associated with the invention are explained below, using several examples of embodiment shown in the drawing, where FIG. 1 is an end view of a symmetrical bearing bushing according to prior art, FIG. 2 is a section through the receiving component of a bearing bushing in a machine part according to FIG. 1, FIG. 3 is an end view of the bearing bushing component equipped according to the invention, FIG. 4 is an end view of the machine part designed according to the invention, paired with a known symmetrical bearing bushing, FIG. 4a is a section through the receiving component of a bearing bushing and a machine part according to FIG. 4, FIG. 4b is the section IV—IV according to FIG. 4a, FIG. 5 is a section through a machine part, FIG. 5a is section A—A according to FIG. 5 and FIG. 5b is section B—B according to FIG. 5.

The bearing bushing shown has an inside bore 1 for receiving a shaft, and an outside lateral surface 2. The bearing bushing is further equipped with a flange 3 extending beyond the lateral surface 2, which flange is mounted on a machine part 4 by means of fastening screws 14. For receiving the fastening screws 14, the flange 3 is provided with bores 6 arranged on a circle 5 which is concentric to the lateral surface 2. On a circle 5' of the same size in FIG. 4b, the machine part 4 has bores 7 configured as tapped holes, which are engaged by the fastening screws 14. A random marking 8, always recurring—unchanged—in the same location, on the bearing bushing helps suppress the error of parallelism deviation of the axis during assembly.

The inside bore 1 of the bearing bushing is arranged eccentrically to lateral surface 2. This configuration of the bearing bushing serves to modify, within a certain range, the distance between two shafts facing each other in such a way that the shaft axes are situated exactly coaxially to one another. The range of adjustability depends on the degree of the eccentricity x and amounts to no more than double the value 2x of the center distance of the circles established by the inside bore 1 and the lateral surface 2. In order to achieve a finer graduation, circle 5, for instance, has nine evenly-distributed bores 6 for receiving the fastening screws 14.

In the case of the bearing bushing shown in FIG. 1, the eccentricity of inside bore 1 to lateral surface 2 is configured symmetrically to the drill pattern (arrangement) of the bores 6 in flange 3. The exact same drill pattern can be found in machine part 4 in FIG. 2. Here, the center $M_1$ of the inside bore 1 lies in one of the axes of symmetry 9 of the lateral surface 2. With nine bores, this results in five different adjustment points P1 through P5 at which the bearing bushing can be fastened to the machine part 4. In order to achieve a finer graduation through a larger number of adjustment points, the number of bores 6 would have to be increased in the case of a symmetrical configuration of the eccentricity.

The bearing bushing according to the invention, shown in FIG. 3, corresponds to the bearing bushing in FIG. 1 in terms of the number and arrangement of the bores 6. What is different is the configuration of the eccentricity of inside bore 1 and lateral surface 2. In the case of the bearing bushing according to FIG. 3, the eccentricity is asymmetrical and, in this case, structurally-realized on the bearing bushing component. With this asymmetrical configuration of the eccentricity, the center $M_1$ of inside bore 1 lies outside the two perpendicular axes of symmetry 9 of the lateral surface 2. The center of inside bore 1 and the center of the lateral surface 2 lie on a straight line which, together with one of the axes of symmetry of the lateral surface 2, includes a random angle $\alpha$. In series applications, the definition of angle $\alpha$ by one quarter of the distance of two adjoining bores 6 has proven advantageous and permits an optimal staggering of the distances between the adjustment points. By selecting another random angle $\alpha$, the distribution of the distances, graduated in relation to one another, between adjoining points P (m) and P (m+1) can be influenced individually.

The straight line 12 in FIG. 3, extending through centers $M_1$, $M_2$ of inside bore 1 and lateral surface 2, intersects the circle 5 at a distance from bore 6 corresponding to one quarter of the distance between the holes of two adjoining bores 6. As can be seen in FIG. 3, this symmetrical configuration of the eccentricity, with the same number of bores 6, increases the number of adjustment positions P1 through P9 of the bearing bushing from five, according to FIG. 1, to nine, according to FIG. 3. The adjustment positions are thus staggered closer together, permitting a finer adjustment of the eccentricity. The manufacturing costs are not increased by this measure on an individual component. The bearing bushing according to FIG. 3 integrates the eccentricity into one component while maintaining the drill pattern in the flange 3 and the machine part 4. The advantage is that this component can be retrofitted into already physically existing machines.

In the embodiment of the invention shown in FIGS. 4 through 4b, a known type of bearing bushing with a symmetrical eccentricity is used, as shown in FIG. 1. The axis of symmetry 10 of the bearing bushing is turned about angle a in relation to the vertical, according to FIG. 4. One can see that—as shown in FIG. 1—the centers $M_1$, $M_2$ of inside bore 1 and lateral surface 2 lie on the axis of symmetry 10 of the bearing bushing. The asymmetry is moved to machine part 4. As can be seen in FIG. 4b, the center $M_1$ of the inside bore of the bearing bushing and the center $M_5$ of circle 5' lie on a straight line 12, which encloses an angle α with the decisive vertical axis of symmetry 11—or 9 of the original drill pattern according to FIG. 1—with circle 5. In this embodiment, as well, nine bores 7 result in nine adjustment positions P1, P2, P3, P4, P5, P6, P7, P8, P9.

Compared to the embodiment of the invention according to FIG. 3, additional manufacturing and logistical advantages can be gained for components to be newly machined. The mirror-symmetrical arrangement of the drill patterns in machine part 4 in FIGS. 4 through 4b, compared to the design of the bearing bushing according to FIG. 3, does not lead to an increase in machining or setup time. On the other hand, the bearing bushing component is the same on both bearing points. The resulting increase in lot sizes leads to a more efficient manufacture.

According to FIG. 5, a shaft 13 bearing a not-shown toothed gear is passed through a machine part 4, which is the housing of a drive, for instance. The shaft 13 is supported in one bearing bushing on each of the opposite sides of machine part 4. These bearing bushings have a symmetrical eccentricity according to FIG. 1 and are fastened to machine part 4 via a receiving unit having an asymmetry according to FIGS. 4 through 4b. The bearing bushings are mounted on the machine part 4 from the outside. For this purpose, the bores 7 for receiving the fastening screws 14 are arranged in mirror-image fashion on the machine part 4. Identical bearing bushings can be used for both sides and—in the assembly from the outside shown here—the bearing bushing only has to be rotated to the left about angle α on the one side and to the right about the same angle α, on the other side. FIGS. 5 through 5b show that deviations from the parallelism of the axes, which are made up of inclination and deviation errors, in other words of deviations in the vertical and the horizontal, can be avoided by the selected asymmetric eccentricity. This is true for the case of an asymmetrical eccentricity in machine part 4, shown in FIGS. 4 through 4b, as well as for the asymmetrical eccentricity in the bearing bushing according to FIG. 3.

I claim:

1. Bearing bushing fastened to a machine part (4), with the bearing bushing having an outside lateral surface (2), an inside bore (1) arranged eccentrically in relation to the lateral surface (2), as well as a flange (3) extending beyond the lateral surface, in which flange (3) bores (6) are arranged on a circle (5), which is concentric in relation to the lateral surface (2), for receiving fastening screws (14) which engage bores (7), arranged on an equally-large circle (5') in machine part (4), characterized in that the eccentricity of the inside bore (1) is asymmetrical on at least one plane in relation to the lateral surface (2) with two perpendicular planes of symmetry, and that the center ($M_1$) of the inside bore (1) lies outside the two axes of symmetry (9) of the lateral surface (2).

2. Bushing bearing according to claim 1, characterized in that the center ($M_1$) of the inside bore (1) and the center ($M_2$) of the lateral surface (2) lie on a straight line (12) which, together with the two perpendicular planes of symmetry of the lateral surface (2), includes an angle α.

3. Bushing bearing according to claim 2, characterized in that the size of angle α is determined by the desired graduation of the adjustment positions for fastening the bearing bushing to the machine part (4), and that the optimal size is defined by one quarter of the distance of two adjoining bores (6) in the flange (3).

4. Machine part for receiving a bearing bushing having an outside lateral surface (2), an inside bore (1) arranged eccentrically in relation to the lateral surface (2), as well a flange (3) extending beyond the lateral surface, in which flange bores (6) for receiving fastening screws (14) are arranged on a circle (5), which is concentric in relation to the lateral surface (2), and which fastening screws engage bores (7), arranged on an equally-large circle (5') in the machine part (4), characterized in that the eccentricity of the inside bore (1) of the bearing bushing is asymmetrical on at least one plane in relation to the circle (5'), containing two perpendicular axes of symmetry (11), of bores (7) in the machine part (4), and that the center of the inside bore (1) lies outside the two axes of symmetry (11) of the circle (5') of bores (7).

5. Machine part according to claim 4, characterized in that the center ($M_1$) of the inside bore (1) and the center ($M_2$) of the circle of bores (7) lie on a straight line in machine part (4), which straight line, together with one of the two perpendicular planes of symmetry of the circle (5') of bores (7) in the machine part (4), encompass an angle α.

6. Machine part according to claim 5, characterized in that the size of angle α is determined by the desired graduation of the adjustment positions for fastening the bearing bushing to the machine part (4), and that the optimal size is defined by one quarter of the distance of two adjoining bores (7) in machine part (4).

* * * * *